United States Patent [19]

Miyauchi

[11] Patent Number: 4,673,200
[45] Date of Patent: Jun. 16, 1987

[54] FLUID JOINT

[75] Inventor: Fumio Miyauchi, Kanagawa, Japan

[73] Assignee: Ikeda Bussan Co., Ltd., Ayase, Japan

[21] Appl. No.: 809,739

[22] Filed: Dec. 17, 1985

[30] Foreign Application Priority Data

Jan. 24, 1985 [JP] Japan .................. 60-8310[U]

[51] Int. Cl.⁴ ............................. F16L 37/12
[52] U.S. Cl. .................. 285/319; 285/331; 285/921
[58] Field of Search .......... 285/319, 921, 331

[56] References Cited

U.S. PATENT DOCUMENTS

| 116,655 | 7/1871 | Westinghouse, Jr. | 285/319 X |
| 820,774 | 5/1906 | Flyberg | 285/319 X |
| 921,691 | 5/1909 | Friday | 285/921 X |
| 940,678 | 11/1909 | Doane et al. | 285/319 X |
| 951,889 | 3/1910 | Tener | 285/319 |
| 3,202,442 | 8/1965 | Abbey et al. | 285/331 X |
| 3,394,954 | 7/1968 | Sarns | 285/319 |
| 3,455,579 | 7/1969 | Olliff, Jr. et al. | 285/319 X |
| 3,569,903 | 3/1971 | Brishka | 285/319 X |
| 3,588,149 | 6/1971 | Demler, Sr. | 285/319 X |
| 4,026,581 | 5/1977 | Pasbrig | 285/319 X |
| 4,123,091 | 10/1978 | Cosentino et al. | 285/921 X |
| 4,451,069 | 5/1984 | Melone | 285/921 X |

FOREIGN PATENT DOCUMENTS 59-154430  10/1984  Japan .

Primary Examiner—Thomas F. Callaghan
Attorney, Agent, or Firm—Schwartz, Jeffery, Schwaab, Mack, Blumenthal & Evans

[57] ABSTRACT

An improved fluid joint is disclosed herein, which comprises male and female members, each having a longitudinally extending through passage. The male member has a cylindrical part, and the female member has a cylindrical receptacle part which is sized to snugly receive therein the cylindrical part of the male member. An O-ring is coaxially disposed about the cylindrical part, so that, upon coupling of the male and female members, the cylindrical part of the male member is sealingly and rotatably received in the cylindrical receptacle part of the female member while providing fluid communication between the passages of the male and female members.

7 Claims, 4 Drawing Figures

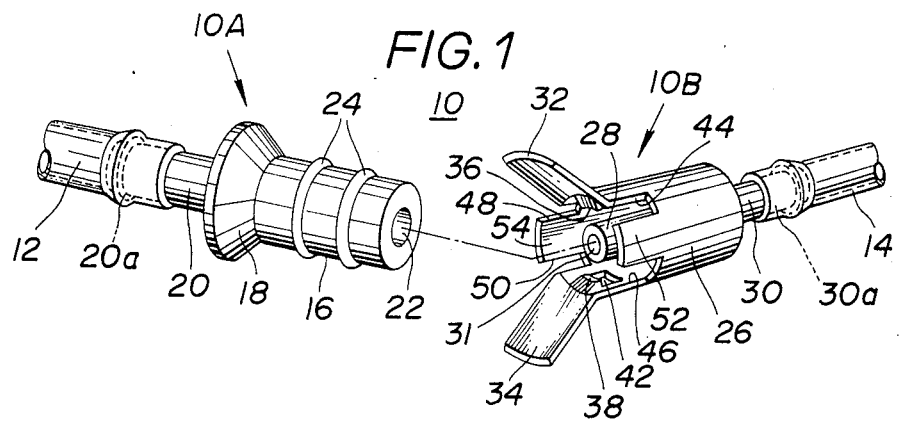
FIG. 1
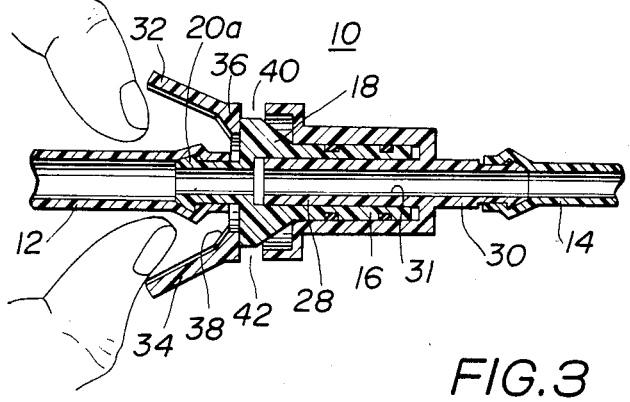
FIG. 2
FIG. 4
(PRIOR ART)
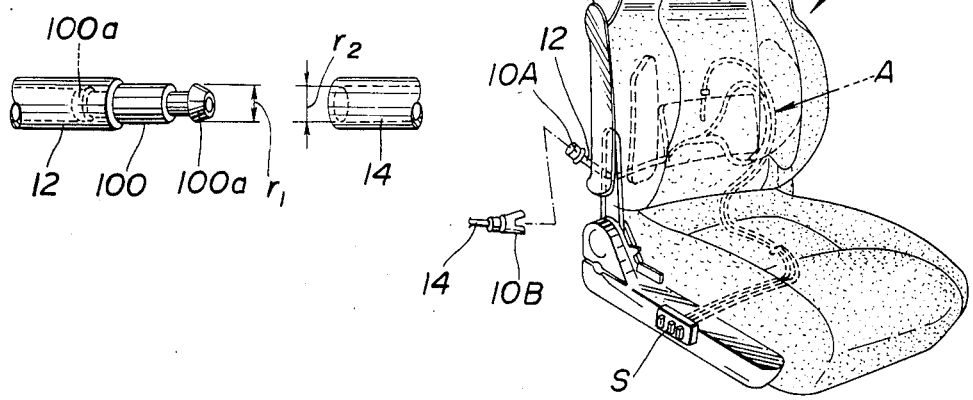
FIG. 3

4,673,200

FLUID JOINT

BACKGROUND OF THE INVENTION

1. Field of the Invention

The present invention relates to a fluid joint for joining two tubes through which a fluid flows, and more particularly to a fluid joint which is appropriate for joining tubes through which a gas, such as air, flows.

2. Description of the Prior Art

Hitherto, various kinds of fluid joints have been proposed and put into practical use in the field wherein connection of two fluid conveying tubes is required. However, as will be described hereinafter, some of them are of a one piece type wherein a male member is force fitted into the end of a tube. This arrangement, while being simple, induces the problem that, once assembled, relative rotation of one tube with respect to the other is difficult due to the nature of the force fit and thus renders the removal of twists which remain in the tubes after assembly, rather difficult.

SUMMARY OF THE INVENTION

It is therefore an object of the present invention to provide an improved fluid joint which is free of the above-mentioned drawback.

According to the present invention, there is provided an improved fluid joint which comprises male and female members which can be coupled while permitting relative rotation therebetween.

According to the present invention, there is provided a fluid joint for joining two tubes, which comprises a male member having a longitudinally extending through passage, the male member including a cylindrical part, a frusto-conical part and a tubular part which coaxially united in this order, the tubular part being connected to one of the tubes, a female member having a longitudinally extending through passage, the female member including a cylindrical receptacle part and an outer tubular part which are coaxially united, the outer tubular part being connected to the other of the tubes, the receptacle part being so sized as to snugly receive therein the cylindrical part of the male member, locking means for locking the male member to the female member while permitting relative rotation therebetween, releasing means for disabling the locking means when actuated, and sealing means for sealing a clearance which is defined between the cylindrical part of the male member and the cylindrical receptacle part of the female member when these two members are coupled.

BRIEF DESCRIPTION OF THE DRAWINGS

Other objects and advantages of the present invention will become apparent from the following description when taken in conjunction with the accompanying drawings, in which:

FIG. 1 is a perspective view of a fluid joint of the present invention, showing male and female members uncoupled;

FIG. 2 is a sectional view of the fluid joint with the male and female members properly coupled;

FIG. 3 is a perspective view of an automotive seat equipped with an adjustable lumber support of an air bag type to which the fluid joint of the present invention is practically applied; and FIG. 4 is a perspective view of a conventional fluid joint.

DESCRIPTION OF A CONVENTIONAL FLUID JOINT

Prior to describing in detail the present invention, one of conventional fluid joints will be described with reference to FIG. 4 in order to clarify the invention.

In FIG. 4, there is shown a conventional fluid joint 100 which joins two tubes 12 and 14 of elastic material. The fluid joint 100 is formed at its axial ends with enlarged and tapered head portions or male portions 100a. Each head portion 100a has a maximum diameter r1 which is greater than the inner diameter r2 of the corresponding tube 14 or 12. Upon requirement of joining the two tubes 12 and 14, the head portions 100a are force fitted into the corresponding tubes 12 and 14.

However, the above-mentioned tube joining induces the following problems due to the nature of the force fitting. That is, once the two tubes are fitted to the joint 100, relative rotation between the two tubes is difficult due to the nature of the force fitting and thus renders the removal of any twists which remain in the tubes after fitting, rather difficult. As known, remaining of such twists narrows the sectional areas of the tube and deteriorates the external appearance of the arrangement of the tubes. Furthermore, connection and disconnection of the two tubes 12 and 14 are difficult.

DETAILED DESCRIPTION OF THE INVENTION

Referring to FIGS. 1 to 3, particularly FIGS. 1 and 2 of the drawings, there is shown an improved fluid joint 10 according to the present invention. As is best understood from FIG. 1, the fluid joint 10 of the invention generally comprises a male member 10A and a female member 10B which are detachably coupled. As is seen in FIG. 3, the fluid joint 10 is applicable to a fluid line of an adjustable lumber support device A of air bag type which is mounted in a seatback portion of an automotive seat B. In the lumber support device A shown in FIG. 3, the male member 10A is fixed to a tube 12 which extends through a control switch S to an air back C mounted in the seatback, while, the female member 10B is fixed to a tube 14 which extends to a pressurized air supplier (not shown).

The male member 10A is constructed of for example plastics and comprises a cylindrical part 16, a frusto-conical part 18 and a tubular part 20 which are coaxially united in this order. As is seen, the frusto-conical part 18 is oriented with the conical surface facing toward the cylindrical part 16. A passage 22 is formed in the male member 10A, which extends longitudinally therethrough. The tubular part 20 is formed at its leading end with an enlarged tapered portion 20a which is to be fitted in the tube 12. Two spaced O-rings 24 are coaxially disposed about the cylindrical part 16. For this disposition, the cylindrical part 16 is formed with two coaxial grooves (no numerals) into which the O-rings 24 are stationally received, as is seen from FIG. 2.

The female member 10B is constructed of for example plastics and comprises a cylindrical receptacle part 26, an inner tubular part 28 and an outer tubular part 30 which are coaxially united. As is best understood from FIG. 2, the inner tubular part 28 is placed in the cylindrical receptacle part 26 and coaxially united with the outer tubular part 30 which projects outwardly from the receptacle part 26. A through passage 31 is formed in the female member 10B, which extends axially in the inner and outer tubular parts 28 and 30. The inner tubular part 28 is sized to be snugly received in the through passage 22 of the male member 10A. The receptacle part 26 is sized to snugly receive therein the cylindrical portion 16 of the male member 10A. A pair of larger lugs 32 and 34 extend diagonally outwardly from the diametrically opposed ends of the receptacle part 26. Each larger lug 32 or 34 is concave in shape. The receptacle part 26 is formed near the roots of the larger lugs 32 and 34 with locking pawls 36 and 38 which project inwardly. The top of each locking pawl 36 or 38 has a concave surface and an opening 40 or 42 (see FIG. 2) is formed in the receptacle part 26 just behind the corresponding locking pawl 36 or 38. Four slits 44, 46, 48 and 50 are formed in the receptacle part 26, which extend axially from the mouth of the receptacle part 26 to the intermediate portion of the same thereby leaving between adjacent two slits (that is, between the slits 44 and 46, or 48 and 50) smaller lug 52 or 54. More particularly, each slit 44, 46, 48 or 50 is formed to have one side which is flush with one side of the corresponding larger lug 32 or 34, so that the flexibility of each larger lug is increased or improved. Like the case of the male member 10A, the outer tubular part 30 is formed with an enlarged tapered head portion 30a which is snugly fitted in the tube 14.

Upon requirement of coupling, the cylindrical part 16 of the male member 10A is thrusted into the receptacle part 26 of the female member 10B having the inner tubular part 28 of the female member 10B received in the through passage 22 of the male member 10A. When the insertion of the male member 10A comes to a certain degree, the locking pawls 36 and 38 contact to and slide on the conical surface of the frusto-conical part 18 of the male member 10A. This sliding movement is effected against a biasing force exerted by the locking pawls during this movement, and finally the locking pawls 36 and 38 fall into the gap defined behind the frusto-conical part 18. With this, the male and female members 10A and 10B are locked to each other as is seen in FIG. 2. In this condition, the relative rotation between the coupled male and female members 10A and 10B is freely permitted while assuring the sealing of the through passages 22 and 31 from the open air due to the provision of the O-rings 24. With the inner tubular part 28 of the female member 10A, the insertion of the cylindrical part 16 of the male member 10A into the receptacle part 26 of the female member 10B is assuredly carried out. However, if desired, the inner tubular part 28 may be removed from the female member 10B.

Upon requirement of uncoupling, the larger lugs 32 and 34 are spread apart by using the thumb and forefinger as is seen from FIG. 2. With this, the locking pawls 36 and 38 are disengaged from the shoulder portion of the frusto-conical part 18 of the male member 10A. Thus, when, with the larger lugs 32 and 34 being spread apart, the male and female members 10A and 10B are pulled from each other, these two members are disconnected.

As will be understood from the foregoing description, in accordance with the present invention, the relative rotation between the male and female members 10A and 10B is permitted while assuring sealing of the passages of the members from the open air. In fact, when the male and female members 10A and 10B are brought into coupling with each other with at least one of the two tubes 12 and 14 being twisted, these two members 10A and 10B can be easily handled to turn in the directions to remove the twists from the tubes. Furthermore, the coupling and uncoupling of the two members 10A and 10B are easily carried out because of the inherent constructions as described hereinabove.

What is claimed is:

1. A fluid joint for joining two tubes, comprising:
   a male member having a longitudinally extending through passage, said male member including a cylindrical part, a frusto-conical part and a tubular part, said parts being coaxially united in this order, said frusto-conical part being arranged with its concical surface facing towards said cylindrical part and said tubular part being adapted to connect with one of the two tubes;
   a female member having a longitudinally extending through passage, said female member including a cylindrical receptacle part sized to snugly receive therein the cylindrical part of said male member and an outer tubular part coaxially united with said receptacle part and projected outwardly therefrom, said outer tubular part being adapted to connect with the other of the two tubes;
   locking means for locking, upon coupling therebetween, said male and female members together while permitting relative rotation about the axis of the same;
   releasing means for disabling said locking means when actuated; and
   sealing means for sealing a clearance which may be defined between said cylindrical part of said male member and said cylindrical receptacle part of said female member when these two members are coupled;
   wherein said locking means comprises a pair of locking pawls which are integrally formed on the diametrically opposed portions of said cylindrical receptacle part of said female member, said locking pawls being projected inwardly of said receptacle part and, upon proper coupling of said male member and female member, lockingly engaged with an outer peripheral portion of said frusto-conical part of the male member; and
   wherein said releasing means comprises a pair of lugs which are integrally formed on said cylindrical receptacle part of the female member and extend diagonally outwardly from said diametrically opposed portions where said locking pawls are positioned respectively.

2. A fluid joint as claimed in claim 1, in which said female member further comprises an inner tubuler part which is coaxially disposed in said cylindrical part and connected to a bottom portion of the same in a manner to be aligned with said outer tubular part, said inner tubular part being so sized as to be snugly received in said through passage of said male member.

3. A fluid joint as claimed in claim 2, in which an opening is formed in said cylindrical receptacle part of said female member at the position just behind each locking pawl.

4. A fluid joint as claimed in claim 3, in which said sealing means comprises an O-ring which is coaxially disposed on said cylindrical part of said male member.

5. A fluid joint as claimed in claim 4, in which said O-ring is disposed in an annular groove formed in said cylindrical part of said male member.

6. A fluid joint as claimed in claim 5, in which said cylindrical receptacle part is formed with longitudinally extending slits for increasing the flexibility of said lugs.

7. A fluid joint as claimed in claim 6, in which adjacent two of said slits define therebetween a holding lug which is integral with said cylindrical receptacle part, said holding lug holding one side of said cylindrical part of said male member upon coupling of said male and female members.

* * * * *